(12) United States Patent
Matsubara

(10) Patent No.: US 8,532,403 B2
(45) Date of Patent: Sep. 10, 2013

(54) IMAGE PROCESSING APPARATUS AND IMAGE PROCESSING METHOD

(75) Inventor: Masao Matsubara, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 1388 days.

(21) Appl. No.: 11/708,525

(22) Filed: Feb. 20, 2007

(65) Prior Publication Data

US 2007/0223836 A1    Sep. 27, 2007

(30) Foreign Application Priority Data

Mar. 23, 2006   (JP) ................................. 2006-081151

(51) Int. Cl.
 *G06K 9/36*      (2006.01)
 *G06K 9/40*      (2006.01)
(52) U.S. Cl.
 USPC .......................................... 382/232; 382/274
(58) Field of Classification Search
 USPC ....................................................... 382/232
 See application file for complete search history.

(56) References Cited

U.S. PATENT DOCUMENTS

| | | | | |
|---|---|---|---|---|
| 4,941,193 A | * | 7/1990 | Barnsley et al. | 382/249 |
| 5,065,447 A | * | 11/1991 | Barnsley et al. | 382/249 |
| 5,701,369 A | * | 12/1997 | Moon et al. | 382/249 |
| 5,838,833 A | * | 11/1998 | Ishikawa et al. | 382/249 |
| 5,867,221 A | * | 2/1999 | Pullen et al. | 375/240.16 |
| 5,923,376 A | * | 7/1999 | Pullen et al. | 375/240.16 |

FOREIGN PATENT DOCUMENTS

| | | | |
|---|---|---|---|
| JP | 5-225378 A | | 9/1993 |
| JP | 9-275565 A | | 10/1997 |
| JP | 10224801 A | * | 8/1998 |

OTHER PUBLICATIONS

Japanese Office Action dated Feb. 15, 2011 (and English translation thereof) in counterpart Japanese Application No. 2006-081151.

* cited by examiner

*Primary Examiner* — David Zarka
*Assistant Examiner* — Jhere Rowland
(74) *Attorney, Agent, or Firm* — Holtz, Holtz, Goodman & Chick, PC

(57) ABSTRACT

To reduce the time for searching a similar image area to the first image area to speed up image coding, an image processing apparatus 100 includes: a range block processing section 51 to calculate a contrast value of a range block constituting an image; a domain block processing section 52 to calculate contrast values of a plurality of domain blocks; a contrast value judging section 53 to compare the contrast values of the domain blocks to the contrast value of the range block so as to specify a similar domain block candidate; and a coding processing section 54 to search the domain block similar to the range block out of the domain block candidates and to code a relation information of the searched domain block to the range block.

3 Claims, 3 Drawing Sheets

IMAGE PROCESSING APPARATUS AND IMAGE PROCESSING METHOD

CROSS-REFERENCE TO RELATED APPLICATIONS

This application is based on and claims the benefit of priority of Japanese Patent Application No. 2006-81151 filed on Mar. 23, 2006, the entire contents of which are incorporated herein.

BACKGROUND OF THE INVENTION

1. Field of the Invention

The present invention relates to an image processing apparatus and image processing method which performs image coding processing to code an image.

2. Description of Related Art

A method using motion-compensated prediction has been known as a method of coding and compressing a moving image. The motion-compensated prediction is to detect a motion vector of a moving image by image block matching which detects an image area in a reference image similar to an image area in a part of an image.

On the other hand, fractal image coding which uses a structural feature of an image of self-similarity to compress the image has been known as a coding technique at high compression rate. This fractal image coding is to search a domain block in a specified area similar to a range block which is a part of an image by rotation or the like of the range block. This processing also uses the image block matching. Specifically, an image is divided into non-overlapping range blocks (unit blocks of R×R pixels) firstly, and a domain block (a block of D×D pixels, D>R) larger than the range block is also cut out of the image. This range block is subjected to an affine transformation (scaling, rotation, mirroring and the like) so as to search a domain block having the most similar pattern to the range block. Thereafter, information of the relation between these blocks is stored as a code.

Here, searching a domain block similar to a range block takes a long time. In order to reduce the time, an image coding method has been developed, which parameterizes range blocks and domain blocks previously and extract domain blocks having the same parameter as a certain range block as candidates for coding (for example, see JP 09-275565A).

However, in the method of JP 09-275565A or the like, a parameter for the narrowing down is not invariant to an affine transformation. Therefore, it has been problematic that such method does not work sufficiently for improving the processing which uses an affine transformation.

SUMMARY OF THE INVENTION

It is an object of the present invention to provide an image processing apparatus and image processing method which can reduce the time for searching a similar image area similar to a first image area and can speed up image coding processing.

According to a first aspect of the invention, an image processing apparatus comprises: a first image area obtaining section to obtain a first image area of a predetermined shape from an image; a second image area obtaining section to obtain second image areas of a same shape as the first image area from the image; a first contrast value calculating section to calculate a contrast value of the first image area obtained by the first image area obtaining section; a second contrast value calculating section to calculate contrast values of the second image areas obtained by the second image area obtaining section; and an image coding section to search the second image area similar to the first image area based on the contrast value of the first image area and the contrast values of the second image areas, and to code relation information of the searched similar second image area with respect to the first image area.

According to a second aspect of the invention, an image processing method comprises: obtaining a first image area of a predetermined shape from an image; calculating a contrast value of the first image area; obtaining second image areas of a same shape as the first image area from the image; calculating contrast values of the second image areas; and searching the second image area similar to the first image area based on the contrast value of the first image area and the contrast values of the second image areas, and coding relation information of the searched similar second image area with respect to the first image area.

According to a third aspect of the invention, a computer-readable medium stores a program which causes a computer to execute the processing of: obtaining a first image area of a predetermined shape from an image; calculating a contrast value of the first image area; obtaining second image areas of a same shape as the first image area from the image; calculating contrast values of the second image areas; and searching the second image area similar to the first image area based on the contrast value of the first image area and the contrast values of the second image areas, and coding relation information of the searched similar second image area with respect to the first image area.

DETAILED DESCRIPTION OF THE PREFERRED EMBODIMENT

Figure 1:
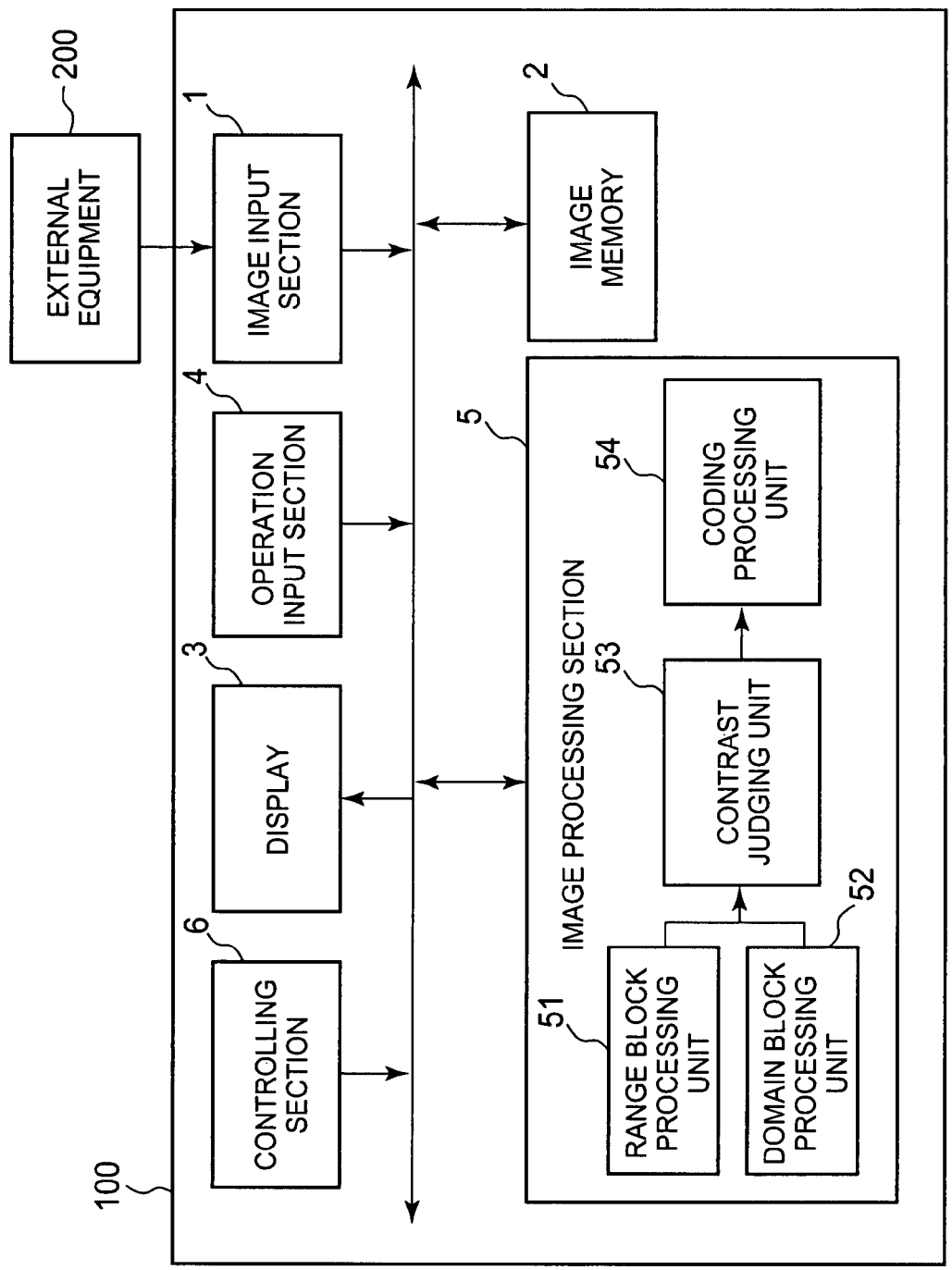
FIG. 1 is a block diagram showing a functional constitution of an image processing apparatus which is exemplified as an embodiment of the present invention.

Hereinafter, an embodiment of the present invention is described with reference to the drawings. However, the scope of the invention is not limited to the illustrated examples. FIG. 1 is a block diagram showing a functional constitution of an image processing apparatus 100 which is exemplified as an embodiment of the present invention.

The image processing apparatus 100 performs fractal image coding processing which uses a structural feature of an image of self-similarity to compress the image. The image processing apparatus 100 is, for example, composed of a personal computer, a workstation or the like. Specifically, the image processing apparatus 100 comprises, as shown in FIG. 1, an image input section 1 to which an image data to be subjected to coding processing is input, an image memory 2 to store the input image data, a display 3 to display the image or the like, an operation input section 4 to which selection of image data and execution directions of various processing are input, an image processing section 5 to perform a predetermined image processing such as coding processing to the image data, and a controlling section 6 to control these sections.

The image input section 1 comprises an external input terminal (not shown) and the like, and receives an image data transmitted from an external equipment 200, for example, through a USB cable (not shown). The image input section 1 may be composed of a PC card reader or the like, and read an image data stored in a memory card.

The image memory 2 is composed of a non-volatile built-in memory (e.g. flash memory), and stores the image data to be subjected to coding processing input through the image input section 1.

The display 3 (e.g. liquid crystal display (LCD) or CRT) displays a predetermined image data, input screen to input various information, and the like, based on a display control signal input from the controlling section 6.

The operation input section 4 comprises a keyboard, mouse and the like, and outputs an operation signal operated on a key and mouse by a user to the controlling section 6. The keyboard is composed of data input keys to input data (e.g. numbers and characters), up-down right-left move keys, various function keys, and the like.

The controlling section 6 comprises, for example, a CPU, a ROM, a RAM, and the like (not shown). The CPU reads out various programs stored in the ROM and develops them to a working area of the RAM, controls an execution of various processing according to these programs. These various processing start at a predetermined timing or based on an operation signal or the like input from the operation input section 4.

The image processing section 5 comprises a range block processing unit 51 to process range blocks constituting the image, a domain block processing unit 52 to process domain blocks constituting the image, a contrast value judging unit 53 to compare contrast values of the range block and domain block to judge them, a coding processing unit 54 to perform coding processing of the image, and the like.

The range block processing unit 51 functions as a first image area obtaining section, and divides an image of the image data input through the image input section 1 into a plurality of range blocks (first image areas) having non-overlapping predetermined shape (e.g. 8×8 pixels) to obtain the range blocks.

The range block processing unit 51 also functions as a first contrast value calculating section, and calculates a contrast value of one range block of the plurality of the range blocks. Specifically, the range block processing unit 51 specifies the maximum and minimum brightness values of a plurality of pixels constituting one range block based on the image data of the range block, and obtains the difference of the values as the contrast value of the range block. The obtained contrast values of the plurality of range blocks are added to a contrast database in the RAM.

The domain block processing unit 52 functions as a second image area obtaining section, and forms a domain image which is a reduced image of the image data input through the image input section 1 and forms a plurality of domain blocks (second image areas) having the same length in each side as the range blocks from the domain image to obtain them.

The domain block processing unit 52 also functions as a second contrast value calculating section, and calculates contrast values of the plurality of domain blocks. Specifically, the domain block processing unit 52, for example, specifies the maximum and minimum brightness values of a plurality of pixels constituting one domain block based on the image data of each domain block, and obtains the difference of the values as the contrast value of the domain block. The obtained contrast values of the plurality of domain blocks are added to the contrast database in the RAM.

The contrast value judging unit 53 compares a contrast value of one of the plurality of domain blocks formed by the domain block processing unit 52 to a contrast value of one of the plurality of range blocks formed by the range block processing unit 51, and judges them. According the judgment result, the judged domain block is specified as a similar domain block candidate corresponding to the judged range block.

The coding processing unit 54 functions as an image coding section, and performs a fractal image coding processing to code relation information of the similar domain block candidate to the range block specified by the contrast value judging unit 53. That is, the coding processing unit 54 performs an affine transformation to the similar domain block candidate specified by the contrast value judging unit 53, and calculates a minimum square error thereof to the range block. The coding processing unit 54 also functions as a similar image area specifying section, and specifies a domain block having the smallest minimum square error among the plurality of calculated domain blocks.

The relation information includes, for example, positional information of the similar domain block, an affine transformation coefficient, and the like.

Figure 2:
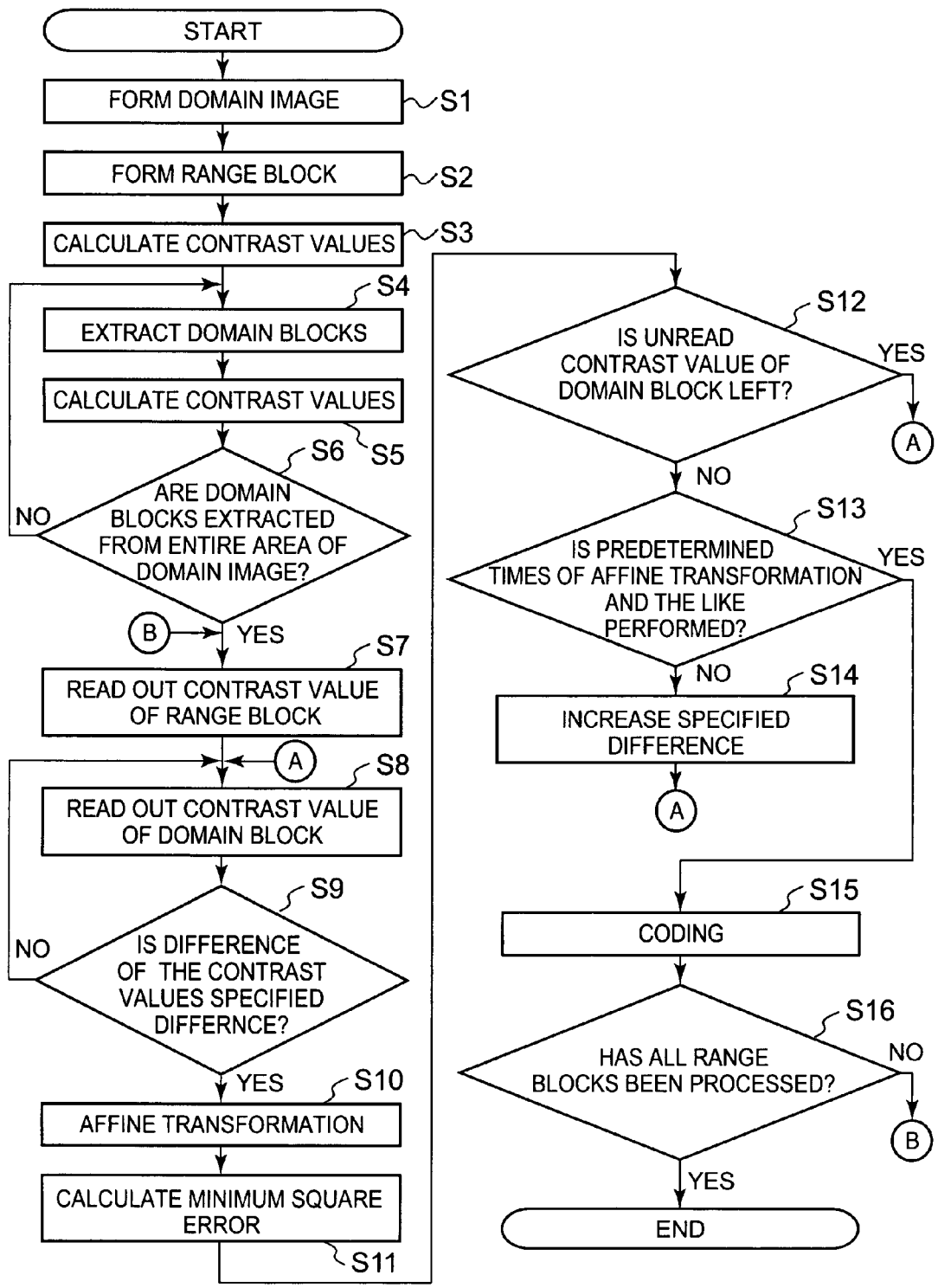
FIG. 2 is a flowchart showing an operation example of the image processing apparatus regarding fractal image coding processing.

Next, the fractal image coding processing is described with reference to FIG. 2. FIG. 2 is a flowchart showing an operation example of the image processing apparatus regarding fractal image coding processing.

The fractal image coding processing is executed by the image processing section 5 under control of the controlling section 6. Specifically, as shown in FIG. 2, the domain block processing unit 52 of the image processing section 5 firstly reduces the predetermined image data input through the image input section 1 to form and obtain the domain image (step S1).

After the range block processing unit 51 of the image processing unit 5 divides the original image into a plurality of blocks to form the range blocks (step S2), it calculates the contrast value of each range block and added it to the contrast database in the RAM (step S3).

Next, the upper left area of the formed domain image is specified as an extraction position of the domain block. The domain block processing unit 52 extracts a domain block having the same size as the range block from the domain image at the specified extraction position (step S4), and calculates a contrast value of the domain block (step S5). Here, it is checked whether the entire area of the domain image has been extracted as the domain blocks or not. When the entire area of the domain image is not extracted (step S6; No), the extraction position of the domain block shifts one (1) pixel, and the process repeats steps S4 and S5. This repeats until the extraction position reaches lower right area of the domain image. When the domain blocks are extracted from the entire area of the domain image (step S6; Yes), the controlling section 6 stores the contrast values of all of the extracted domain blocks as the contrast database in the RAM.

Next, after the specified difference value is set to 0, the contrast value judging unit 53 of the image processing section 5 refers to the contrast database of the RAM, and reads out the contrast value of the first range block. Subsequently, the contrast value judging unit 53 reads out one of the plurality of contrast values of domain blocks (step S8), and judges whether the absolute value of the difference between the read contrast value and the contrast value of the range block is equal to the specified difference or not (step S9). When it is judged the contrast values are different from each other (step S9; No), the process goes to step S8 and the image processing section 5 reads out another contrast value of domain blocks, and judges whether the difference is equal or not.

On the other hand, in step S9, when it is judged the contrast values are equal (step S9; Yes), the coding processing section 54 of the image processing section 5 performs an affine transformation to the similar domain block candidate having the same contrast value (step S10), and calculates the minimum square error to the range block (step S11).

Next, the image processing section 5 judges whether an unread contrast value of the domain block is left in the contrast database or not (step S12). When it is judged there is an unread contrast value (step S12; Yes), the process goes to step S8 and the image processing section 5 reads out another contrast value of the domain blocks, and judges whether they are equal or not.

On the other hand, when it is judged that an unread contrast value is not left (step S12; No), the image processing section 5 judges whether the affine transformation and minimum square error calculation are performed for predetermined times or more, or not (step S13). When it is judged these processing have not been performed for the predetermined times or more (step S13; No), the image processing section 5 adds one (1) to the specified difference value. The process goes to step S8, and the image processing section 5 controls the execution of the rest processing. Every time it is judged these processing have not performed for the predetermined times or more (step S13; No) in the following judgment of step S13, the image processing section 5 adds one (1) to the specified difference value. Such difference equality judgment with the specified difference having a certain range can be a proximity judgment.

On the other hand, when it is judged these processing have been performed for the predetermined times or more (step S13; Yes), the coding processing unit 54 of the image processing section 5 specifies the smallest minimum square value out of the minimum square values of the plurality of the similar domain blocks, and codes the relation information between the domain block (similar domain block) having the specified smallest minimum square value and the range block (step S15). Subsequently, the image processing section 5 judges whether all of the divided range blocks are subjected to the searching and coding of the similar domain block (steps S7 to S15) or not (step S16). When it is judged not all of the range blocks have subjected to the processing (step S16; No), the process goes to the step S7 and the image processing section 5 controls the execution of the following processing.

As described above, according to the image processing apparatus 100 of the present embodiment, it becomes possible to find out a domain block similar to a certain range block out of a plurality of domain blocks in view of a contrast value which is invariant to rotations of the range block and domain block. Then, an affine transformation is performed to the plurality of extracted similar domain block candidates and minimum square errors thereof to the range block are calculated. Thus, it becomes possible to specify a domain block having the smallest value as a similar domain block. Accordingly, while the entire area of the domain image is a search area of the similar domain block, it becomes possible to reduce the number of affine transformations and calculations of minimum square error which take long processing time. As a result, it becomes possible to reduce the time for searching a similar domain block which is similar to a range block, and to speed up the fractal image coding processing.

The present invention is not limited to the above-described embodiment, and various modifications and design changes can be made within a spirit of the present invention. For example, in the above embodiment, the fractal image coding processing to code relation information of a predetermined domain block to a range block is explained as an example of the image coding processing. However, the present invention is not limited thereto. That is, any image coding processing may be applied as long as it specifies the second image area having a predetermined contrast value in view of contrast values which are values of image invariant to rotation, and codes relation information of the second image area to the first image area.

Further, in the above embodiment, a reduced image of an input image is formed and domain blocks having the same size in each side as a range block is obtained from the reduced image. However, the present invention is not limited thereto. For example, a plurality of domain blocks having larger size in each side than a range block may be formed and obtained, and the domain block may be reduced after the search with a contrast value.

In addition, in the above embodiment, the judgment whether an affine transformation and the like have been performed for predetermined times or not is performed after all of the contrast values stored in the contrast database is subjected to the approximate judgment with a contrast value of a predetermined range block. However, the present invention is not limited thereto. For example, the approximate judgment of the contrast values of the domain block and range block may end and the process may go to the next step, as soon as a predetermined times of affine transformations and the like are performed.

Figure 3:
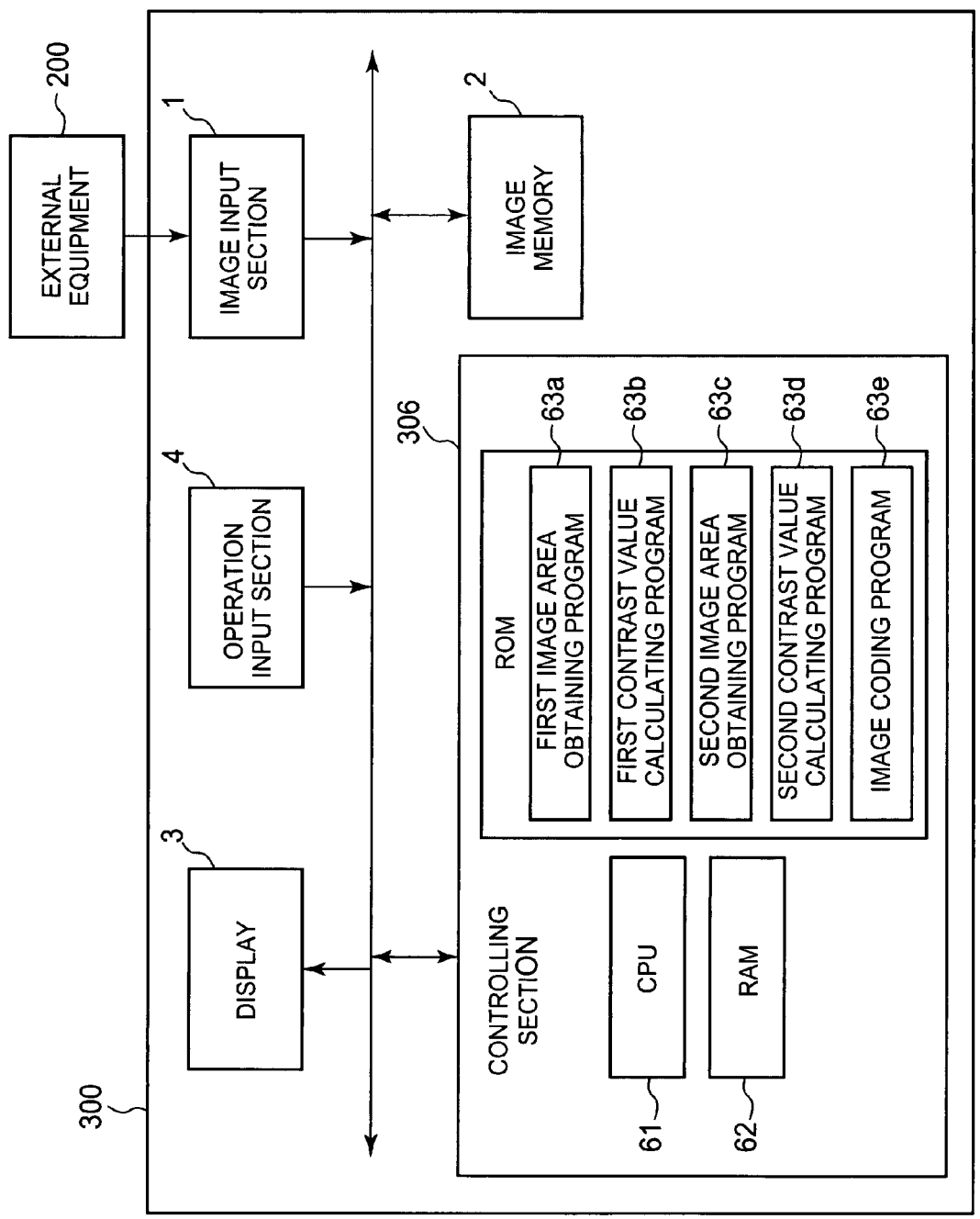
FIG. 3 is a block diagram showing a functional constitution of an image forming apparatus of a variation 1.

Further, the functions of the first image area obtaining section, first contrast value calculating section, second image area obtaining section, second contrast value calculating section, and image coding section of the above embodiment may be realized, for example, based on execution of a predetermined program by the CPU of the controlling section. That is, as shown in FIG. 3, an image processing apparatus 300 of the variation 1 comprises a controlling section 306 which includes a CPU 61, a RAM 62, and a ROM 63. The ROM (storage medium) 63 stores a first image area obtaining program 63a, a firs contrast value calculating program 63b, a second image area obtaining program 63c, a second contrast value calculating program 63d, and an image coding program 63e.

The first image area obtaining program 63a causes the CPU 61 to realize the function of obtaining a first image area (range block) of a predetermined shape from an image. The first contrast value calculating program 63b causes the CPU 61 to realize the function of calculating a contrast value of the first image area. The second image area obtaining program 63c causes the CPU 61 to realize the function of obtaining a second image area (domain block) having the same shape as the first image area from the image. The second contrast value calculating program 63d causes the CPU 61 to realize the function of calculating a contrast value of the second image area. The coding program 63e causes the CPU 61 to realize the function of searching the second image area similar to the first image area based on the contrast values of the first image area and second image area and coding relation information of the searched similar second image area with respect to the first image area.

What is claimed is:

1. An image processing apparatus that performs fractal coding, the apparatus comprising:
  a first calculating section which: (i) specifies maximum and minimum brightness values of a plurality of pixels of a range block, and (ii) calculates a difference of the maximum and minimum brightness values as a contrast value of the range block;

a second calculating section which: (i) specifies maximum and minimum brightness values of a plurality of pixels of each of a plurality of domain blocks, and (ii) calculates differences of the maximum and minimum brightness values as respective contrast values of the plurality of domain blocks;

a short-listing section which short-lists, from among the plurality of domain blocks, those domain blocks in each of which a difference between: (i) the contrast value of the range block, and (ii) the contrast value of the domain block, is equal to or less than a specified difference value;

a third calculating section which: (i) performs affine transformation to each of the short-listed domain blocks, and (ii) calculates respective error values between the range block and each of the short-listed domain blocks to which the affine transformation has been performed;

a judging section which judges whether or not the calculation of the error values is performed for at least a predetermined number of times and whether or not the short-listed domain blocks include at least the predetermined number of domain block candidates;

an increasing section which increases the specified difference value when the judging section judges that the calculation of the error values is not performed for at least the predetermined number of times and that the short-listed domain blocks do not include at least the predetermined number of domain block candidates; and a coding section which, when the judging section judges that the short-listed domain blocks include at least the predetermined number of domain block candidates, codes relation information between: (i) the range block, and (ii) a domain block which is from among the short-listed domain blocks and which has a smallest error value from among the calculated error values.

2. An image processing method for an image processing apparatus that performs fractal coding, the method comprising:

specifying maximum and minimum brightness values of a plurality of pixels of a range block;

calculating a difference of the maximum and minimum brightness values as a contrast value of the range block;

specifying maximum and minimum brightness values of a plurality of pixels of each of a plurality of domain blocks;

calculating differences of the maximum and minimum brightness values as respective contrast values of the plurality of domain blocks;

short-listing, from among the plurality of domain blocks, those domain blocks in each of which a difference between: (i) the contrast value of the range block, and (ii) the contrast value of the domain block, is equal to or less than a specified difference value;

performing affine transformation to each of the short-listed domain blocks;

calculating respective error values between: (i) the range block, and (ii) each of the short-listed domain blocks to which the affine transformation has been performed;

judging whether or not the calculation of the error values is performed for at least a predetermined number of times and whether or not the short-listed domain blocks include at least the predetermined number of domain block candidates;

increasing the specified difference value when it is judged that the calculation of the error values is not performed for at least the predetermined number of times and that the short-listed domain blocks do not include at least the predetermined number of domain block candidates; and when it is judged that the short-listed domain blocks include at least the predetermined number of domain block candidates, coding relation information between: (i) the range block, and (ii) a domain block which is from among the short-listed domain blocks and which has a smallest error value from among the calculated error values.

3. A non-transitory computer-readable storage medium having stored thereon a program for an image processing apparatus that performs fractal coding, the program causing a computer to perform functions comprising:

specifying maximum and minimum brightness values of a plurality of pixels of a range block;

calculating a difference of the maximum and minimum brightness values as a contrast value of the range block;

specifying maximum and minimum brightness values of a plurality of pixels of each of a plurality of domain blocks;

calculating differences of the maximum and minimum brightness values as respective contrast values of the plurality of domain blocks;

short-listing, from among the plurality of domain blocks, those domain blocks in each of which a difference between: (i) the contrast value of the range block, and (ii) the contrast value of the domain block, is equal to or less than a specified difference value;

performing affine transformation to each of the short-listed domain blocks;

calculating respective error values between: (i) the range block, and (ii) each of the short-listed domain blocks to which the affine transformation has been performed; and judging whether or not the calculation of the error values is performed for at least a predetermined number of times and whether or not the short-listed domain blocks include at least the predetermined number of domain block candidates;

increasing the specified difference value when it is judged that the calculation of the error values is not performed for at least the predetermined number of times and that the short-listed domain blocks do not include at least the predetermined number of domain block candidates; and when it is judged that the short-listed domain blocks include at least the predetermined number of domain block candidates, coding relation information between: (i) the range block, and (ii) a domain block which is from among the short-listed domain blocks and which has a smallest error value from among the calculated error values.

* * * * *